US011978600B2

(12) United States Patent
Teppati et al.

(10) Patent No.: US 11,978,600 B2
(45) Date of Patent: May 7, 2024

(54) DIELECTRIC-INSULATION OR ARC-EXTINCTION FLUID

(71) Applicant: HITACHI ENERGY LTD, Zürich (CH)

(72) Inventors: Valeria Teppati, Otelfingen (CH); Saskia Scheel, Lenzburg (CH); Charles Doiron, Basel (CH); Daniel Over, Klingnau (CH); Philipp Simka, Wohlen (CH); Branimir Radisavljevic, Zürich (CH)

(73) Assignee: HITACHI ENERGY LTD, Zürich (CH)

( * ) Notice: Subject to any disclaimer, the term of this patent is extended or adjusted under 35 U.S.C. 154(b) by 226 days.

(21) Appl. No.: 17/621,211

(22) PCT Filed: Mar. 30, 2020

(86) PCT No.: PCT/EP2020/059011
§ 371 (c)(1),
(2) Date: Dec. 20, 2021

(87) PCT Pub. No.: WO2020/254004
PCT Pub. Date: Dec. 24, 2020

(65) Prior Publication Data

US 2022/0367134 A1 Nov. 17, 2022

(30) Foreign Application Priority Data

Jun. 21, 2019 (EP) .................................... 19181655

(51) Int. Cl.

| | |
|---|---|
| ***H01H 33/22*** | (2006.01) |
| ***H01B 3/56*** | (2006.01) |
| ***H01H 33/56*** | (2006.01) |

(52) U.S. Cl.
CPC ............... *H01H 33/22* (2013.01); *H01B 3/56* (2013.01); *H01H 2033/566* (2013.01)

(58) Field of Classification Search
CPC ...... H01H 33/22; H01H 33/302; H01H 33/56; H01H 33/82; H01H 2033/566; H01B 3/56
(Continued)

(56) References Cited

U.S. PATENT DOCUMENTS 9,837,801 B2 * 12/2017 Kieffel .................... H01F 38/20
9,899,167 B2 * 2/2018 Florez ................ H01H 33/7015
(Continued)

FOREIGN PATENT DOCUMENTS

AU 2012229664 A1 10/2012
CN 107275206 A 10/2017
(Continued)

OTHER PUBLICATIONS

International Search Report and Written Opinion of the International Searching Authority, PCT/EP2020/059011, dated Jun. 9, 2020, 10 pages.
(Continued)

*Primary Examiner* — William A Bolton
(74) *Attorney, Agent, or Firm* — Sage Patent Group

(57) ABSTRACT

The present invention relates to a dielectric-insulation or arc-extinction fluid for an apparatus for the generation, the transmission, the distribution and/or the usage of electrical energy, the fluid being a mixture comprising a fluoroolefin and oxygen. According the fluoroolefin is a monohydrofluoroolefin containing from 4 to 5 carbon atoms, the hydrogen atom being bound to a carbon atom of the double bond or directly adjacent to the double bond.

20 Claims, 2 Drawing Sheets

(58) Field of Classification Search
USPC .............. 218/51, 55, 57, 67, 68, 79, 85, 100
See application file for complete search history.

(56) References Cited

U.S. PATENT DOCUMENTS

| | | | | |
|---|---|---|---|---|
| 9,928,973 | B2* | 3/2018 | Claessens | H02B 13/055 |
| 10,256,008 | B2* | 4/2019 | Johnson | H02B 13/055 |
| 2007/0108403 | A1 | 5/2007 | Sievert et al. | |
| 2013/0277334 | A1* | 10/2013 | Mantilla | H01H 33/22<br>252/571 |
| 2014/0083737 | A1* | 3/2014 | Piccoz | H02B 13/055<br>174/11 R |
| 2016/0261095 | A1* | 9/2016 | Tehlar | H01B 3/56 |
| 2017/0032976 | A1 | 2/2017 | Anderson et al. | |
| 2017/0213673 | A1* | 7/2017 | Elshani | H01H 33/56 |
| 2017/0317475 | A1* | 11/2017 | Kramer | G01N 21/3504 |
| 2018/0047525 | A1* | 2/2018 | Vladuchick | H02B 13/0655 |
| 2018/0247779 | A1 | 8/2018 | Rached | |
| 2019/0027268 | A1 | 1/2019 | Doiron et al. | |

FOREIGN PATENT DOCUMENTS

| | | | |
|---|---|---|---|
| JP | 2008084768 | A | 4/2008 |
| JP | 2008531975 | A | 8/2008 |
| JP | 2013030531 | A | 2/2013 |
| JP | 2015533029 | A | 11/2015 |
| JP | 2018534718 | A | 11/2018 |
| WO | WO 2010/142346 | A1 | 12/2010 |
| WO | WO 2012/080246 | A1 | 6/2012 |
| WO | WO 2014/037566 | A1 | 3/2014 |
| WO | 2014070838 | A1 | 5/2014 |
| WO | WO 2017/162578 | A1 | 9/2017 |
| WO | 2017184975 | A1 | 10/2017 |

OTHER PUBLICATIONS

Extended European Search Report, European Patent Application No. EP19181655.2, dated Oct. 1, 2019, 6 pages.

Japanese Notice of Reasons for Refusal, Japanese Patent Application No. 2021-576157, dated Jan. 12, 2023, 3 pages.

* cited by examiner

DIELECTRIC-INSULATION OR ARC-EXTINCTION FLUID

CROSS REFERENCE TO RELATED APPLICATIONS

This application is a 35 U.S.C. § 371 national stage application of PCT International Application No. PCT/EP2020/059011 filed on Mar. 30, 2020, which in turn claims foreign priority to European Patent Application No. 19181655.2, filed on Jun. 21, 2019, the disclosures and content of which are incorporated by reference herein in their entirety.

TECHNICAL FIELD

The various embodiments relate to a dielectric-insulation or arc-extinction fluid for an apparatus for the generation, the transmission, the distribution and/or the usage of electrical energy

BACKGROUND

Dielectric insulation media in gaseous or liquid state are conventionally applied for the insulation of an electrically conductive part in a wide variety of apparatuses, such as for example switchgears, gas-insulated substations (GIS), gas-insulated lines (GIL), transformers, and others, or electrical components, such as e.g. instrument transformers, tap changers, and others.

In medium or high voltage metal-encapsulated switchgears, for example, the electrically conductive part is arranged in a gas-tight housing, which defines an insulating space, said insulation space comprising an insulation gas and separating the housing from the electrically conductive part(s) without letting electrical current to pass through the insulation space. For interrupting the current in e.g. high voltage switchgears, the insulation gas further functions as an arc-extinction gas.

Sulphur hexafluoride ($SF_6$) is a well-established insulation gas due to its outstanding dielectric properties and its chemical inertness. Despite of these properties, efforts to look for an alternative insulation gas have nevertheless been intensified, in particular in view of a lower Global Warming Potential (GWP) than the one of $SF_6$.

Recently, the use of organofluorine compounds in dielectric insulation media has been suggested. Specifically, WO-A-2010/142346 discloses a dielectric insulation medium comprising a fluoroketone containing from 4 to 12 carbon atoms. Fluoroketones have been shown to have a high dielectric strength. At the same time, they have a very low GWP and very low toxicity. The combination of these characteristics renders these fluoroketones highly suitable as a possible alternative to conventional insulation gases.

Despite the high dielectric strength of the fluoroketones disclosed in WO-A-2010/142346, the insulation performance of the respective insulation medium can be limited due to the relatively low vapour pressure of the fluoroketone. This is particularly the case for applications in a low temperature environment. In these applications, only a relatively low partial pressure of the fluoroketone can be maintained without it becoming liquefied.

In consideration of these shortcomings, WO-A-2012/080246 suggests a dielectric insulation gas comprising a fluoroketone containing exactly 5 carbon atoms, in particular 1,1,1,3,4,4,4-heptafluoro-3-(trifluoromethyl)-butan-2-one (hereinafter referred to as "C5K" of "C5"), in a mixture with a carrier gas, in particular air or an air component, which together with the fluoroketone provides a non-linear increase of the dielectric strength of the insulation medium over the sum of dielectric strengths of the gas components of the insulation medium.

Notwithstanding the excellent properties of the insulation medium according to WO-A-2012/080246, there is an ongoing interest in providing an alternative "non-$SF_6$" dielectric compound of lower boiling point in comparison to the above mentioned fluoroketones, thereby allowing for a higher concentration of the dielectric compound in the insulation gas. Ultimately, this shall allow for achieving an improved dielectric performance, also at relatively low operating temperatures.

In this regard, WO 2014/037566 suggests the use of a gaseous medium comprising heptafluoroisobutyronitrile in mixture with a diluting gas and thereby reports a boiling point of heptafluoroisobutyronitrile of −3.9° C. at 1013 hPa. However, heptafluoroisobutyronitrile (hereinafter also referred to as "C4N") has the drawback of having a high impact on the environment; its atmospheric lifetime is about 11'000 days and its GWP is about 2'210, i.e. much higher than the respective values of C5K having an atmospheric lifetime of less than 20 days and a GWP of 1.

It has further been found that when used e.g. in a GIS, heptafluoroisobutyronitrile exhibits poor compatibility with the material of the GIS, which on the one hand affects the material getting into contact with the dielectric insulation or arc-extinction fluid. On the other hand, also the functionality of the insulation medium itself is affected due to decomposition of the heptafluoroisobutyronitrile contained therein.

In consideration of these shortcomings, the use of octafluorobutene has been suggested in WO 2017/162578, according to which octafluorobutene shows comparable dielectric performance like an insulation medium comprising heptafluoroisobutyronitrile, but has a much lower impact on the environment than the latter, in particular a low GWP. Apart from its good dielectric performance, octafluorobutene has the further advantage of a relatively low boiling point and a very good material compatibility.

When using any of the dielectric organofluorine compounds mentioned above in general, and octafluorobutene in specific, oxygen is preferably admixed to the medium, in order to avoid the formation of soot in the apparatus.

However, it has been found that in the presence of oxygen, octafluorobutene degrades fastly when subjected to partial discharge. In particular in high voltage applications, partial discharges cannot be avoided completely and the use of a mixture containing octafluorobutene and oxygen can in these applications lead to a relatively fast degradation of the dielectric insulation fluid and to the generation of harmful by-products. The degradation of octafluorobutene as a consequence of undergoing a [2+2]-cycloaddition has been most surprising in light of the underlying thermodynamic principles.

SUMMARY

In consideration of the above, the problem to be solved by various embodiments described herein is thus to provide a dielectric-insulation or arc-extinction fluid containing a dielectric compound, which—in having similar dielectric properties compared to octafluorobutene—has a higher stability when subjected to partial discharge in the presence of oxygen.

The problem is solved by the dielectric-insulation or arc-extinction fluid of various embodiments as defined in independent claim 1. Preferred embodiments of the dielectric-insulation or arc-extinction fluid of the various embodiments are defined in the dependent claims.

According to claim 1, the dielectric-insulation or arc-extinction fluid, which is destined to be used in an apparatus for the generation, the transmission, the distribution and/or the usage of electrical energy, is a mixture comprising a fluoroolefin and oxygen. Contrary to the teaching of WO 2017/162578 to use octafluorobutene and hence a perfluoroolefin, the fluoroolefin of various embodiments is a monohydrofluoroolefin containing from 4 to 5 carbon atoms, the hydrogen atom being bound to a carbon atom of the double bond or directly adjacent to the double bond.

BRIEF DESCRIPTION OF THE DRAWINGS

The accompanying drawings, which are included to provide a further understanding of the disclosure and are incorporated in and constitute a part of this application, illustrate certain non-limiting embodiments of the various embodiments. In the drawings.

DETAILED DESCRIPTION

Figure 1:
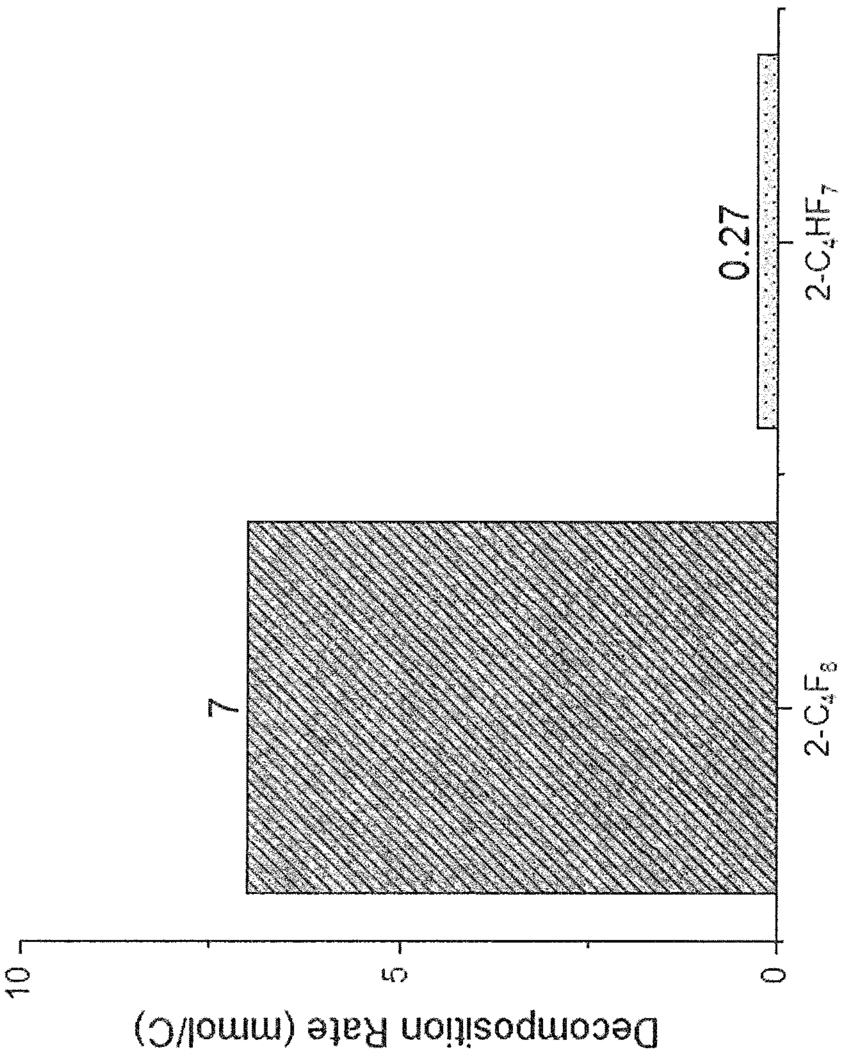
FIG. 1 is an illustration showing the decomposition rate of 2-$C_4HF_7$, i.e. a monohydrofluoroolefin according to embodiments described herein, in comparison to the perfluoroolefin octafluorobutene under partial discharge in the presence of oxygen.

It has surprisingly been found that by the presence of a hydrogen atom bound in a position as specified in claim 1, the double bond strength of the fluoroolefin is increased sufficiently for protecting the double bond from being attacked by an oxygen molecule undergoing a [2+2]-cycloaddition. Hence, the monohydrofluoroolefins of various embodiments are in the presence of oxygen more stable under partial discharge than it is the case for the fully fluorinated octafluorobutene. In this regard, it has further been found that despite of the fluorolefin being substituted with a hydrogen atom, no hydrofluoric acid is generated even under harsh conditions of partial discharge.

In addition to the improved stability in comparison to the perfluorinated compound, the monohydrofluoroolefin is environmentally safe and in particular has a very low GWP. The finding of a hydrofluoroolefin having low GWP is very surprising, considering that according to WO 2017/162578 a perfluorinated compound is deliberately chosen in aiming at a weakening of the double bond by the strongly electronegative fluorine atoms, in order for a low GWP to be provided.

The term "fluid" (used in the term "dielectric insulation fluid or arc-extinction fluid") relates to any fluid and particularly encompasses liquids, gases as well as two-phase systems comprising both a gaseous and a liquid phase.

In the context of the various embodiments, the term "environmentally safe" has the meaning of being non-ozone depleting and having a Global Warming Potential over a time horizon of 100 years, relative to carbon dioxide, of less than 10.

Specifically, the term "environmentally safe" also means that the dielectric-insulation or arc-extinction fluid has a relatively low toxicity. More specifically, the median lethal dose (LC50; lethal concentration 50%; measured on rats) of the dielectric compound used in the environmentally safe dielectric-insulation or arc-extinction fluid is higher than 4'000 ppm, preferably higher than 5'000 ppm and more preferably higher than 6'000 ppm, i.e. far higher than a median lethal dose indicative of toxic substance, which typically lies between 500 and 2500 ppm. Thus, the dielectric compound used according to various embodiments ranges within the same toxicity class as previously mentioned C4N (having a much higher GWP than the dielectric compound used according to the various embodiments) and CSK.

In addition to its surprisingly high environmental compatibility, the monohydrofluoroolefin of the various embodiments has been found to have a relatively high dielectric strength, in particular a dielectric strength comparable or even higher than the respective perfluoroolefin.

The high dielectric withstand achievable by using a monohydrofluoroolefin according to various embodiments is i.e. based on the relatively low boiling point of the compound, which allows a relatively high gas density to be achieved.

The applicability of a monohydrofluoroolefin for achieving an environmentally safe insulation or arc-extinction medium is most surprising, since alkenes generally undergo addition reactions and are thus typically not envisaged for applications where a high inertness of the compound is of paramount importance.

In consideration of the general doctrine regarding alkenes in general, it is therefore most surprising that monohydrofluoroolefins not only exhibit a relatively low GWP, but that they are also non-flammable and range within the same toxicity class as for example heptafluoroisobutyronitrile (C4N) and 1,1,1,3,4,4,4-heptafluoro-3-(trifluoromethyl)-butan-2-one (C5K).

It has further surprisingly been found that the monohydrofluoroolefin-containing fluid is inert, i.e. non-reactive, towards the material of the apparatus, with which the fluid gets into direct contact during its use in the apparatus. Thus, the insulation or arc-extinction composition exhibits a high material compatibility and remains its functionality also when used in the apparatus over a long period of time. Specifically, the material compatibility is highly improved in comparison to the material compatibility of an insulation medium containing heptafluoroisobutyronitrile.

As mentioned, the fluoroolefin according to various embodiments is a monohydrofluoroolefin, the hydrogen atom being bound to a carbon atom of the double bond or directly adjacent to the double bond, i.e. in α-position of the double bond. Specifically, the fluoroolefin is selected from the group of compounds consisting of:

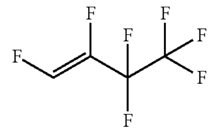

1,2,3,3,4,4,4-heptafluoro-1-butene

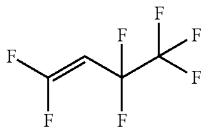

1,1,3,3,4,4,4-heptafluoro-1-butene

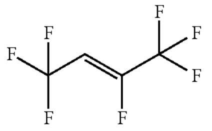

1,1,1,3,4,4,4-heptafluoro-2-butene

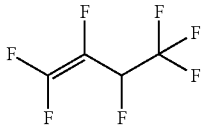

1,1,2,3,4,4,4-heptafluoro-1-butene

-continued

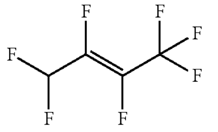

1,1,2,3,4,4,4-heptafluoro-2-butene

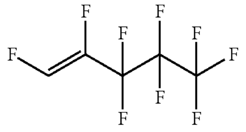

1,2,3,3,4,4,5,5,5-nonafluoro-1-pentene

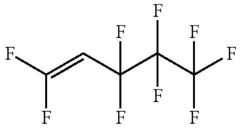

1,1,3,3,4,4,5,5,5-nonafluoro-1-pentene

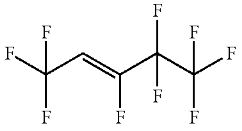

1,1,1,3,4,4,5,5,5-nonafluoro-2-pentene

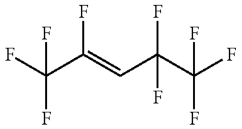

1,1,1,2,4,4,5,5,5-nonafluoro-2-pentene

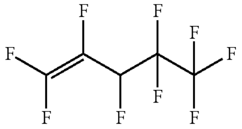

1,2,3,3,4,4,5,5,5-nonafluoro-1-pentene

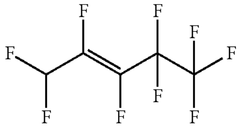

1,1,2,3,4,4,5,5,5-nonafluoro-2-pentene

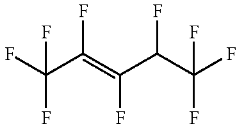

1,1,1,2,3,4,5,5,5-nonafluoro-2-pentene,

Including both the cis- and trans-isomer of the respective compound, and mixtures thereof.

In other words, the fluoroolefin is thus preferably selected from the group consisting of cis-1,2,3,3,4,4,4-heptafluoro-1-butene, trans-1,2,3,3,4,4,4-heptafluoro-1-butene, cis-1,1,3,3,4,4,4-heptafluoro-1-butene, trans-1,1,3,3,4,4,4-heptafluoro-1-butene, cis-1,1,1,3,4,4,4-heptafluoro-2-butene, trans-1,1,1,3,4,4,4-heptafluoro-2-butene, 1,1,2,3,4,4,4-heptafluoro-1-butene, cis-1,1,2,3,4,4,4-heptafluoro-2-butene, trans-1,1,2,3,4,4,4-heptafluoro-2-butene, cis-1,2,3,3,4,4,5,5,5-nonafluoro-1-pentene, trans-1,2,3,3,4,4,5,5,5-nonafluoro-1-pentene, 1,1,3,3,4,4,5,5,5-nonafluoro-1-pentene, cis-1,1,1,3,4,4,5,5,5-nonafluoro-2-pentene, trans-1,1,1,3,4,4,5,5,5-nonafluoro-2-pentene, cis-1,1,1,2,4,4,5,5,5-nonafluoro-2-pentene, trans-1,1,1,2,4,4,5,5,5-nonafluoro-2-pentene, cis-1,1,1,2,3,4,5,5,5-nonafluoro-2-pentene, trans-1,1,1,2,3,4,5,5,5-nonafluoro-2-pentene, and mixtures thereof.

In containing only one hydrogen atom, the monohydrofluoroolefin used in the fluid of various embodiments is clearly different both from perfluoroolefins as well as from olefins containing two or more hydrogen atoms, such as dihydrofluoroolefin.

As also mentioned, the mixture comprises oxygen to prevent soot formation, in particular during a switching operation. It has been found that the content of oxygen in the insulation or arc-extinction fluid does not significantly affect the dielectric withstand of the fluid.

In order to ensure a good prevention from soot being formed, the ratio of oxygen to the fluoroolefin is preferably from 0.5:1 to 4:1, more preferably from 0.7:1 to 2:1, and most preferably is about 1:1.

Apart from oxygen, the mixture preferably comprises at least one further carrier gas component selected from the group consisting of: nitrogen, carbon dioxide, nitrous oxide, and mixtures thereof, and in particular carbon dioxide. This is due to the fact that the partial pressure of the highly dielectric monohydrofluoroolefin is limited at the operating temperature and that a maximum dielectric strength of the mixture is achieved by admixing at least one of these carrier gases, which by themselves also have a relatively high dielectric strength.

A carrier gas mixture comprising carbon dioxide apart from oxygen is particularly preferred, as mentioned above. This mixture provides both a high thermal performance (i.e. arc-extinction performance or arc-extinction strength) due to the use of carbon dioxide, and a high dielectric performance due to the use of the monohydrofluoroolefin. In addition, soot formation is further decreased by using carbon dioxide together with oxygen in the carrier gas mixture.

Depending on the specific application of the fluid, it can in this context be further preferred that the oxygen and carbon dioxide containing mixture additionally contains nitrogen, more preferably in a proportion of less than 20% based on the partial pressure of the carrier gas mixture. The presence of nitrogen can be preferred in view of obtaining a high dielectric strength (dielectric withstand or breakdown strength or voltage) of the fluid in which it is contained, since nitrogen is able to slow down electrons efficiently. In particular in view of the fluid's use in a switching apparatus, a restriction of the nitrogen content to 20% can be preferred, since a higher nitrogen content might lead to a reduction of the arc-extinguishing capabilities of the fluid.

In order to ensure that a relatively high fraction of monohydrofluoroolefin is in gaseous state at operational conditions, the fluid has on the one hand preferably a dew point below a pre-determined threshold temperature, particularly below the minimum operating temperature of the apparatus. On the other hand, a relatively high partial pressure of monohydrofluoroolefin is desired for achieving a high gas density of said component and, hence, a high dielectric withstand strength.

Specifically, the proportion of the fluoroolefin in the dielectric insulation or arc-extinction fluid is from 1 to 20%, more specifically from 2 to 15%. If the dielectric-insulation or arc-extinction fluid is in the form of a gas, the term "proportion" used in this context relates to the percentage of the partial pressure of the fluoroolefin in relation to the total pressure of the dielectric-insulation or arc-extinction gas. Thus, for an exemplary embodiment, in which the partial pressure of the fluoroolefin is 200 mbar and the total pressure of the gas is set to 10 bar, the proportion of the fluoroolefin is 2%. Due to the high dielectric withstand strength (or dielectric breakdown strength or breakdown field strength) of the monohydrofluoroolefin, the dielectric-insulation or arc-extinction fluid exhibits—at the proportions of the monohydrofluoroolefin given above—good dielectric performance at relatively moderate filling pressures of the apparatus.

In view of aiming at a high proportion of fluoroolefin, it can be preferred that the fluid comprises—apart from the monohydrofluoroolefin according to claim 1—an additional monohydrofluoroolefin containing 3 carbon atoms, the hydrogen atom being bound to a carbon atom of the double bond or directly adjacent to the double bond. Specifically, the additional monohydrofluoroolefin is selected from the group consisting of: 1,1,1,2-tetrafluoropropene (HFO-1234yf; also named 2,3,3,3-tetrafluoro-1-propene), 1,2,3,3-tetrafluoro-2-propene (HFO-1234yc), 1,1,3,3-tetrafluoro-2-propene (HFO-1234zc), 1,1,1,3-tetrafluoro-2-propene (HFO-1234ze), 1,1,2,3-tetrafluoro-2-propene (HFO-1234ye), 1,1,1,2,3-pentafluoro-propene (HFO-1225ye), 1,1,2,3,3-pentafluoropropene (HFO-1225yc), 1,1,1,3,3-pentafluoropropene (HFO-1225zc), (Z)1,1,1,3-tetrafluoropropene (HFO-1234zeZ); also named cis-1,3,3,3-tetrafluoro-1-propene), (Z)1,1,2,3-tetrafluoro-2-propene (HFO-1234yeZ), (E)1,1,1,3-tetrafluoropropene (HFO-1234zeE; also named trans-1,3,3,3-tetrafluoro-1-propene), (E)1,1,2,3-tetrafluoro-2-propene (HFO-1234yeE), (Z)1,1,1,2,3-pentafluoropropene (HFO-1225yeZ; also named cis-1,2,3,3,3 pentafluoroprop-1-ene), (E)1,1,1,2,3-pentafluoropropene (HFO-1225yeE; also named trans-1,2,3,3,3 pentafluoroprop-1-ene); and mixtures thereof.

A still further increase in the dielectric performance of the fluid can be achieved, if the fluid comprises—apart from the fluoroolefin—at least one compound selected from the group consisting of: fluoroethers, in particular hydrofluoromonoethers, fluoroketones, in particular perfluoroketones, fluoronitriles, in particular perfluoronitriles, and mixtures thereof. Thus, admixing at least one of these compounds can be preferred.

Apart from the dielectric-insulation or arc-extinction fluid described above, various embodiments further relate to an apparatus for the generation, the transmission, the distribution and/or the usage of electrical energy, said apparatus comprising a housing enclosing an insulating space and an electrically conductive part arranged in the insulating space, wherein said insulating space contains a dielectric-insulation or arc-extinction fluid according to any one of the preceding claims. Specifically, dielectric-insulation or arc-extinction fluid is in gaseous form. However, it is also thinkable that the fluid is partially in gaseous and partially in liquid form due to partial condensation phenomena at low temperatures.

The preferred features of the dielectric-insulation or arc-extinction fluid presented above likewise apply to the dielectric-insulation or arc-extinction fluid of the apparatus of various embodiments. In particular, the dielectric-insulation or arc-extinction fluid is a dielectric-insulation or arc-extinction gas.

According to a further preferred embodiment, the fluid has at operating conditions, specifically when measured at 293.15 K, a pressure higher than 1 bar. Thus, a particularly high dielectric withstand strength can be obtained.

The apparatus can be a medium voltage apparatus, in which case the pressure of the dielectric-insulation or arc-extinction gas is preferably in a range from 1 bar to 3 bar, more preferably from 1 bar to 1.5 bar, and most preferably from 1.3 bar to 1.4 bar, at operating conditions of the medium voltage apparatus.

Alternatively, the apparatus can be a high voltage apparatus, in which case the pressure of the dielectric-insulation or arc-extinction gas is higher than 3 bar, preferably higher than 4 bar and most preferably higher than 4.5 bar at operating conditions of the high voltage apparatus. Specifically, the pressure in the high voltage apparatus can be about 7 bar or even higher, in particular up to 12 bar.

Throughout this application and unless noted otherwise, all references to a pressure in the context of various embodiments refer to the pressure measured at 293.15 K.

Specifically, the apparatus of various embodiments is or is part of a: switchgear, in particular gas-insulated switchgear (GIS), or part and/or component thereof, gas-insulated line (GIL), busbar, bushing, cable, gas-insulated cable, cable joint, current transformer, voltage transformer, sensor, humidity sensor, surge arrester, capacitor, inductance, resistor, insulator, air-insulated insulator, a gas-insulated metal-encapsulated insulator, current limiter, high voltage switch, earthing switch, disconnector, combined disconnector and earthing switch, load-break switch, circuit breaker, gas circuit breaker, generator circuit breaker, gas-insulated vacuum circuit breaker, medium voltage switch, ring main unit, recloser, sectionalizer, low voltage switch, and/or any type of gas-insulated switch, transformer, distribution transformer, power transformer, tap changer, transformer bushing, electrical rotating machine, generator, motor, drive, semiconducting device, computing machine, power semiconductor device, power converter, converter station, convertor building, and components and/or combinations of such devices.

The advantages achievable by various embodiments are particularly apparent in switching applications, in particular in a circuit breaker. In this regard, it has surprisingly been found that by the presence of the monohydrofluoroolefin, the dielectric-insulation or arc-extinction fluid of various embodiments allows—apart from the advantages mentioned above—also a faster dielectric recovery to be achieved, when compared to e.g. pure $CO_2$. Thus, the speed at which the hot gas in a circuit breaker regains its dielectric withstand after the interruption of the current can be increased according to various embodiments.

As mentioned above, the term dielectric-insulation fluid also encompasses a dielectric-insulation liquid. In this context, the use of a monohydrofluoroolefin in a dielectric-insulation liquid for a transformer is specifically mentioned.

When using the dielectric-insulation and/or arc extinction medium of the various embodiments, a sufficiently high dielectric withstand can be achieved also when the minimum operating temperature is relatively low. The apparatus of various embodiments thus specifically relates to an apparatus having a rated minimal operating temperature of −5° C. or lower, preferably −15° C. or lower, most preferably −25° C. or lower.

In order to achieve a high gas density of the fluoroolefin in the fluid, the partial pressure of the fluoroolefin as measured at 293.15 K is preferably in a range from 50 to 1'000 mbar.

In comparison to heptafluoroisobutyronitrile-containing media, the dielectric-insulation fluid of various embodiments therefore allows to achieve comparable dielectric performance at slightly increased filling pressures, but at a much higher ecological safety level, in particular at a much lower GWP.

With regard to the minimum operating temperature of the apparatus in which the fluid of various embodiments is to be used, a dielectric performance (in particular dielectric withstand or breakdown strength) comparable to the one of a heptafluoroisobutyronitrile containing medium can—at the same filling pressure—be achieved at a slightly increased operating temperature, again at a much higher ecological safety level, as discussed above.

Thus, for indoor applications, which according to standard IEC 62271-203:2011 have a minimum operating temperature of −5° C., a high dielectric performance can be achieved by using the fluid of various embodiments while simultaneously ensuring a high environmental safety.

As mentioned above, the partial pressure of the monohydrofluoroolefin is such that the dew point of the dielectric-insulation or arc-extinction fluid is below the minimum operating temperature of the apparatus, thus ensuring that a high fraction of the monohydrofluoroolefin is in gaseous phase at operating conditions of the apparatus, as mentioned above. The dielectric-insulation or arc-extinction fluid has thus preferably a dew point of lower than 5° C., preferably lower than 0° C., more preferably lower than −5° C., more preferably lower than −20° C., most preferably lower than −25° C. and specifically down to −40° C. (Herein, "temperature lower than" means colder temperature). Since the most common operating temperatures of electrical apparatuses are −25° C., −15° C., −5° C. and +5° C., the various embodiments allow a dielectric-insulation or arc-extinction fluid to be provided, which qualifies for all indoor applications and most of the outdoor applications, if not all of the outdoor applications.

The dielectric-insulation or arc-extinction fluid can be used with a conventional adsorber, primarily designed to remove water and impurities from the insulation space, without facing the problem of the monohydrofluoroolefin being adsorbed by the adsorber. Specifically, a zeolite having a pore size from 3 to 5 Å, more specifically a 4 Å zeolite, can be used for desiccation of the insulation space, as there is no or only negligible adsorption of the monohydrofluoroolefin containing from 4 to 5 carbon atoms and having an estimated kinetic diameter of about 6 Å at least. Ultimately, the functionality of the insulation or arc-extinction composition can be maintained over a long period of time, both for the reasons that by the removal of water decomposition reactions of the monohydrofluoroolefin are efficiently suppressed and that no or only a negligible amount of monohydrofluoroolefin is withdrawn from the composition by adsorption.

As mentioned above, the insulation or arc-extinction fluid exhibits a high material compatibility and remains its functionality also when used in the apparatus over a long period of time. In this regard, the various embodiments are of particular relevance when at least some of the solid components of the apparatus that are directly exposed to the insulation gas, are made of a polymeric material, a metal, a metal alloy, a ceramic and/or a composite thereof.

A high material compatibility is in particular also given, if the polymeric material is selected from the group consisting of: silicones, polyolefins, polyethers, polyesters, poly-urethanes, polyepoxides, polyamides, polyimides, polyketones, polysulfones, as well as mixtures or combinations thereof.

In particular, the above mentioned component towards which the fluid of various embodiments exhibits a high compatibility, may be selected from the group consisting of: a coating compound, in particular a paint or a resin, a sealing compound, an adhesive, an insulating compound, a lubricating compound, in particular grease, a molecular sieve, a binder-free molecular sieve, a desiccant, a binder-free desiccant, a humidity sensing material, as well as mixtures thereof.

Specifically, the sealing compound comprises or consists of EPDM or nitrile-butadiene rubber or butyl rubber, in particular isobuten-isopren-rubber (IIR) or chlorobutyl-rubber (CIIR) or brombutyl-rubber (BIIR).

Throughout this application, "medium voltage" relates to voltages in the range of 1 kV to 52 kV or 72 kV, and "high voltage" to voltages above this range. While there are shown and described presently preferred embodiments of the various embodiments, it is to be distinctly understood that the various embodiments are not limited thereto but may otherwise variously be embodied and practised within the scope of the following claims. Therefore, terms like "preferred" or "in particular" or "particularly" or "advantageously", etc. signify optional and exemplary embodiments only.

Examples

Figure 2:
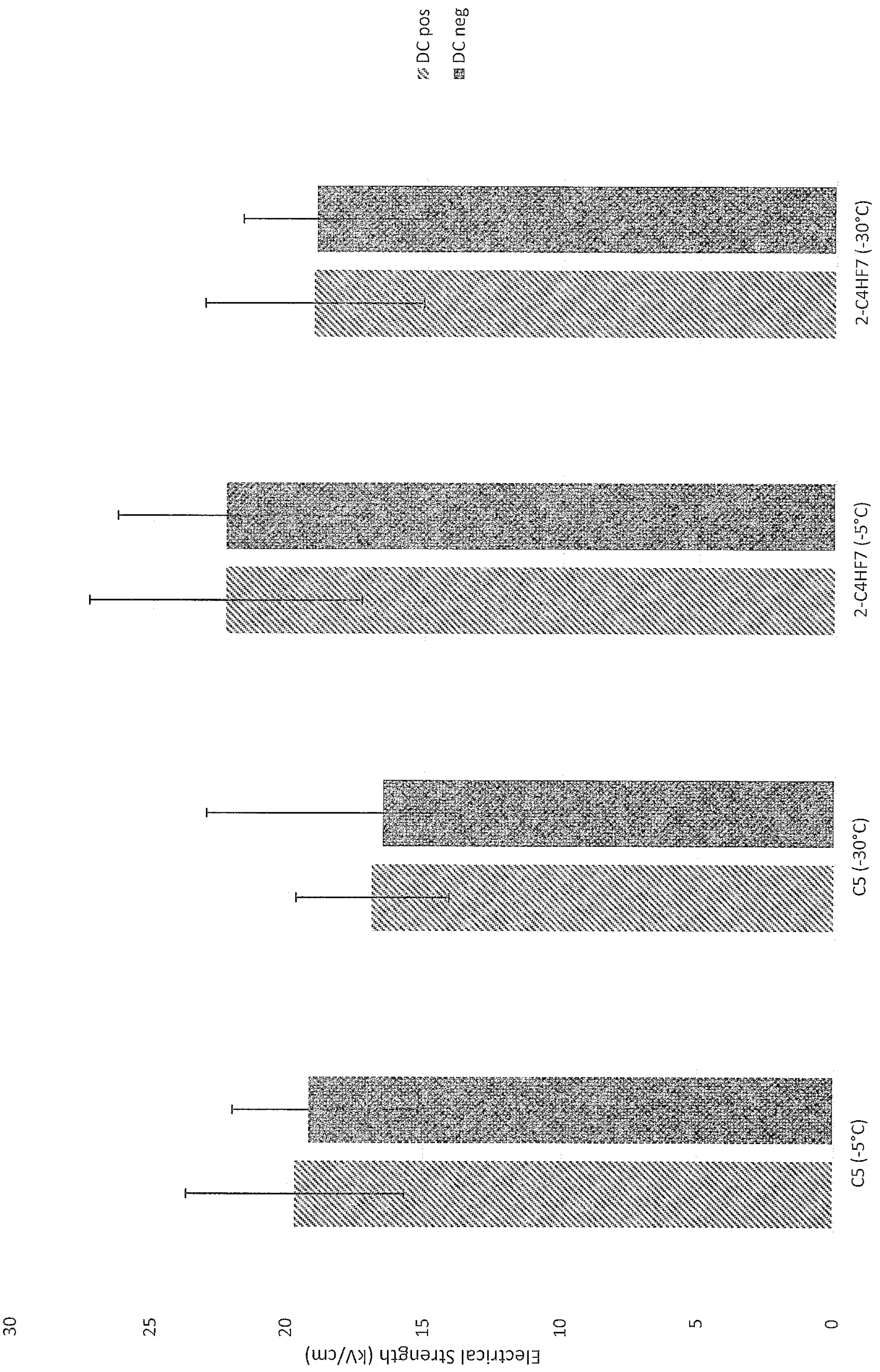
FIG. 2 is an illustration showing the dielectric strength of a mixture according to embodiments described hering containing 2-$C_4HF_7$, oxygen ($O_2$) and carbon dioxide ($CO_2$) in comparison to a respective mixture containing 1,1,1,3,4,4,4-heptafluoro-3-(trifluoromethyl)-butan-2-one ("C5").

The various embodiments are further illustrated by way of following examples together with the accompanying figures, of which:

FIG. 1 shows the decomposition rate of 2-$C_4HF_7$, i.e. a monohydrofluoroolefin according to various embodiments, in comparison to the perfluoroolefin octafluorobutene under partial discharge in the presence of oxygen; and FIG. 2 shows the dielectric strength of a mixture according to various embodiments containing 2-$C_4HF_7$, oxygen ($O_2$) and carbon dioxide ($CO_2$) in comparison to a respective mixture containing 1,1,1,3,4,4,4-heptafluoro-3-(trifluoromethyl)-butan-2-one ("C5").

Decomposition Rate

The decomposition rate of 2-$C_4HF_7$ in a gas mixture containing carbon dioxide and oxygen were tested. Specifically, a gas mixture containing 4 vol.-% 2-$C_4HF_7$, 4 vol.-% $O_2$ and 92 vol.-% $CO_2$ was subjected to partial discharge tests and the resulting decomposition was determined.

Specifically, an experimental setup consisting of a standard GIS-vessel (volume: 55 L) with a needle-plane electrode arrangement was used. A total of ten steel needles (R_100 μm) were connected to a high voltage DC power supply (positive, 0-35 kV). The gap spacing was set to 10 mm. The vessel was equipped with a fan keeping the gas mixture homogeneous during the experiments.

The results of the tests are shown in FIG. 1, according to which under partial discharge a much lower decomposition rate was determined for 2-$C_4HF_7$ (0.27 mmol/C) compared to the decomposition rate of the fully fluorinated 2-$C_4F_8$ (7 mmol/C).

Dielectric Strength

In addition to these tests, the dielectric strength of a mixture containing a monohydrofluoroolefin according to various embodiments, specifically 2-$C_4HF_7$, and having a dew point of −5° C. and −30° C., respectively, was determined and compared to the respective dielectric strength of the perfluoroketone decafluoro-3-methylbutan-2-one ("C5").

Specifically, dielectric withstand tests were performed under DC (step DC, rise-time 300 ns, maximum application time 30 s) in a small vessel (6 L) and custom-built for dielectric testing. Large electrodes (12 cm diameter) with a Rogowski-profile and separated by a small (1.0 cm) distance were used to obtain a uniform field. Prior to the test, the electrodes were sandblasted to create a uniform surface roughness profile (Rt=40 μm).

A large amount of measurements (typically, more than 100) of measurements were performed; the peak voltage level used for each voltage application was randomly selected in the region close to U50, the voltage level for which a 50% breakdown probability is expected. The outcome (breakdown or hold) of each measurement is extracted from the time-dependence of the voltage across the test object. A probit regression is then used to fit the results to a probability distribution and to extract U50 and s, the width of the breakdown probability distribution, from the measurement data.

As shown in FIG. 2, the partial pressure of the monohydrofluoroolefin in the mixture according to various embodiments is at 20° C. higher than the partial pressure of C5 in the mixture containing the same at 20° C. Ultimately, a higher dielectric strength is achieved for the mixtures of various embodiments than for the mixtures containing C5. Specifically, a breakdown voltage of 22.3 kV/mm and 19.1 kV/mm was determined under positive direct current conditions (compared to 19.7 and 16.9 kV/mm, respectively, obtained for the mixture containing C5), whereas a breakdown voltage of 22.3 kV/mm and 19.0 kV/mm was determined under negative direct current conditions (compared to 19.2 and 16.5 kV/mm, respectively, obtained for the mixture containing C5).

The dielectric strengths measured for the mixture according to various embodiments even surpasses the one measured for the mixture containing octafluorobutene of the same partial pressure at 20° C. Specifically, for a mixture containing octafluorobutene at a partial pressure of 228 mbar at 20° C. a breakdown voltage of 17.7 kV/mm was determined under positive direct current conditions and of 17.5 kV/mm under negative direct current conditions, which is lower than the respective values determined for a 2-$C_4HF_7$-containing mixture at the same partial pressure (19.1 kV/mm).

The invention claimed is:

1. A dielectric-insulation or arc-extinction fluid for an apparatus for generation, transmission, distribution and/or usage of electrical energy, the fluid being a mixture comprising a fluoroolefin and oxygen, wherein the fluoroolefin is a monohydrofluoroolefin containing from 4 to 5 carbon atoms, wherein a hydrogen atom being bound to a carbon atom of a double bond or directly adjacent to the double bond.

2. The dielectric-insulation or arc-extinction fluid according to claim 1, wherein the fluoroolefin is selected from the group of compounds consisting of:

cis-1,2,3,3,4,4,4-heptafluoro-1-butene, trans-1,2,3,3,4,4,4-heptafluoro-1-butene, cis-1,1,3,3,4,4,4-heptafluoro-1-butene, trans-1,1,3,3,4,4,4-heptafluoro-1-butene, cis-1,1,1,3,4,4,4-heptafluoro-2-butene, trans-1,1,1,3,4,4,4-heptafluoro-2-butene, 1,1,2,3,4,4,4-heptafluoro-1-butene, cis-1,1,2,3,4,4,4-heptafluoro-2-butene, trans-1,1,2,3,4,4,4-heptafluoro-2-butene, cis-1,2,3,3,4,4,5,5,5-nonafluoro-1-pentene, trans-1,2,3,3,4,4,5,5,5-nonafluoro-1-pentene, 1,1,3,3,4,4,5,5,5-nonafluoro-1-pentene, cis-1,1,1,3,4,4,5,5,5-nonafluoro-2-pentene, trans-1,1,1,3,4,4,5,5,5-nonafluoro-2-pentene, cis-1,1,1,2,4,4,5,5,5-nonafluoro-2-pentene, trans-1,1,1,2,4,4,5,5,5-nonafluoro-2-pentene, cis-1,1,1,2,3,4,5,5,5-nonafluoro-2-pentene, trans-1,1,1,2,3,4,5,5,5-nonafluoro-2-pentene, and mixtures thereof.

3. The dielectric-insulation or arc-extinction fluid according to claim 1, wherein the mixture comprises apart from oxygen at least one further carrier gas component selected from the group consisting of: nitrogen, carbon dioxide, nitrous oxide, and mixtures thereof.

4. The dielectric-insulation or arc-extinction fluid according to claim 1, wherein a proportion of a partial pressure of the fluoroolefin in the dielectric insulation or arc-extinction fluid is from 1 to 20% as related to a total pressure of the dielectric-insulation or arc-extinction gas.

5. The dielectric-insulation or arc-extinction fluid according to claim 1, wherein a ratio of oxygen to the fluoroolefin is from 0.5:1 to 4:1.

6. The dielectric-insulation or arc-extinction fluid according to claim 1, wherein dew point of the fluid is below a minimum operating temperature of the apparatus.

7. The dielectric-insulation or arc-extinction fluid according to claim 1, wherein the fluid further comprises a monohydrofluoroolefin containing 3 carbon atoms, the hydrogen atom being bound to the carbon atom of the double bond or directly adjacent to the double bond.

8. The dielectric-insulation or arc-extinction fluid according to claim 1, wherein the fluid comprises apart from the fluoroolefin at least one compound selected from the group consisting of: fluoroethers, fluoroketones, fluoronitriles, and mixtures thereof.

9. The apparatus for the generation, the transmission, the distribution and/or the usage of electrical energy, said apparatus comprising a housing enclosing an insulating space and an electrically conductive part arranged in the insulating space, wherein said insulating space contains the dielectric-insulation or arc-extinction fluid according to claim 1.

10. The apparatus according to claim 9, wherein the fluid has at operating conditions a pressure higher than 1 bar.

11. The apparatus according to claim 9, being a medium voltage or a high voltage apparatus.

12. The apparatus according to claim 9, wherein the apparatus is a medium voltage apparatus and a pressure of the dielectric-insulation or arc-extinction gas is in a range from 1 bar to 3 bar at operating conditions of the medium voltage apparatus.

13. The apparatus according to claim 9, wherein the apparatus is a high voltage apparatus and a pressure of the dielectric-insulation or arc-extinction gas is higher than 3 bar at operating conditions of the high voltage apparatus.

14. The apparatus according to claim 9, wherein the apparatus is or is part of a: switchgear or part and/or component thereof, gas-insulated line (GIL), busbar, bushing, cable, gas-insulated cable, cable joint, current transformer, voltage transformer, sensor, humidity sensor, surge arrester, capacitor, inductance, resistor, insulator, air-insulated insula-tor, a gas-insulated metal-encapsulated insulator, current limiter, high voltage switch, earthing switch, disconnector, combined disconnector and earthing switch, load-break switch, circuit breaker, gas circuit breaker, generator circuit breaker, gas-insulated vacuum circuit breaker, medium voltage switch, ring main unit, recloser, sectionalizer, low voltage switch, and/or any type of gas-insulated switch, transformer, distribution transformer, power transformer, tap changer, transformer bushing, electrical rotating machine, generator, motor, drive, semiconducting device, computing machine, power semiconductor device, power converter, converter station, convertor building, and components and/or combinations of such devices.

15. The apparatus according to claim 9, a rated minimal operating temperature of the apparatus being −5° C. or lower.

16. The apparatus according to claim 9, wherein a partial pressure of the fluoroolefin as measured at 293.15 K is in a range from 50 to 1,000 mbar.

17. The apparatus according to claim 9, wherein a component of a switchgear is selected from the group consisting of: a coating compound, a sealing compound, an adhesive, an insulating compound, a lubricating compound, grease, a molecular sieve, a binder-free molecular sieve, a desiccant, a binder-free desiccant, a humidity sensing material, as well as mixtures thereof.

18. The apparatus according to claim 17, wherein the sealing compound comprises or consists of ethylene propylene diene monomer (EPDM) or nitrile-butadiene rubber or butyl rubber.

19. The apparatus according to claim 9, wherein a dew point of the dielectric-insulation or arc-extinction fluid is below a minimum operating temperature of the apparatus.

20. A use of the fluid according to claim 1 in a medium or high voltage application.

* * * * *